US011249766B1

(12) United States Patent
Kesiraju et al.

(10) Patent No.: US 11,249,766 B1
(45) Date of Patent: Feb. 15, 2022

(54) COPROCESSOR SYNCHRONIZING INSTRUCTION SUPPRESSION

(71) Applicant: Apple Inc., Cupertino, CA (US)

(72) Inventors: Aditya Kesiraju, San Jose, CA (US); Rajdeep L. Bhuyar, Santa Clara, CA (US); Ran A. Chachick, Providence, RI (US); Andrew J. Beaumont-Smith, Cambridge, MA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/077,654

(22) Filed: Oct. 22, 2020

Related U.S. Application Data

(60) Provisional application No. 63/077,813, filed on Sep. 14, 2020.

(51) Int. Cl.
*G06F 9/38* (2018.01)
*G06F 9/30* (2018.01)

(52) U.S. Cl.
CPC ........ *G06F 9/3877* (2013.01); *G06F 9/30087* (2013.01); *G06F 9/3838* (2013.01)

(58) Field of Classification Search
CPC ......... G06F 9/00–3897; G06F 9/30189; G06F 9/3877; G06F 9/3879; G06F 9/3881; G06F 9/30083; G06F 9/522; G06F 1/3287; G06F 9/52; G06F 9/3838; G06F 9/30087
See application file for complete search history.

(56) References Cited

U.S. PATENT DOCUMENTS

| | | | |
|---|---|---|---|
| 6,782,445 B1 | 8/2004 | Olgiati et al. | |
| 8,387,061 B2 | 2/2013 | Joffe et al. | |
| 2014/0006817 A1* | 1/2014 | Bonen | G06F 1/3287 713/320 |
| 2014/0089589 A1* | 3/2014 | Meier | G06F 9/3838 711/125 |
| 2014/0281196 A1* | 9/2014 | Dixon | G06F 12/0804 711/105 |
| 2014/0281429 A1* | 9/2014 | Brown | G06F 9/30087 712/226 |
| 2015/0198992 A1* | 7/2015 | Kumar | G06F 1/3243 713/320 |
| 2016/0048396 A1* | 2/2016 | Wiencke | G06F 9/3838 712/34 |
| 2016/0179586 A1* | 6/2016 | Wang | G06F 9/3834 711/125 |
| 2018/0121202 A1 | 5/2018 | Chen et al. | |
| 2019/0004995 A1* | 1/2019 | Sankaralingam | G06F 9/3851 |
| 2020/0081748 A1 | 3/2020 | Johnson et al. | |
| 2020/0201648 A1* | 6/2020 | Memon | G06F 9/3855 |
| 2020/0218540 A1* | 7/2020 | Kesiraju | G06F 9/3877 |
| 2020/0272467 A1* | 8/2020 | Kesiraju | G06F 9/345 |

* cited by examiner

*Primary Examiner* — Keith E Vicary
(74) *Attorney, Agent, or Firm* — Kowert, Hood, Munyon, Rankin & Goetzel, P.C.; Lawrence J. Merkel

(57) ABSTRACT

An instruction set architecture including instructions for a processor and instructions for a coprocessor may include synchronizing instructions that may be used to begin and end instruction sequences that include coprocessor instructions (coprocessor sequences). If a terminating synchronizing instruction is followed by an initial synchronizing instruction and the pair are detected in the coprocessor concurrently, the coprocessor may suppress execution of the pair of instructions.

20 Claims, 9 Drawing Sheets

Computer Accessible Storage Medium 800

SOC 804

FIG. 9

COPROCESSOR SYNCHRONIZING INSTRUCTION SUPPRESSION

This application claims benefit of priority to U.S. Provisional Patent Application Ser. No. 63/077,813, filed on Sep. 14, 2020. The above application is incorporated herein by reference in its entirety. To the extent that anything in the incorporate material conflicts with material expressly set forth here, the expressly set forth material controls.

BACKGROUND

Technical Field

Embodiments described herein are related to processors and coprocessors, and more particularly to coprocessors.

Description of the Related Art

Processors are a critical component of many digital systems, often determining how much performance and/or power efficiency can be achieved in the system. In some cases, a subset of the instruction set implemented by the processors can be implemented in a coprocessor that can be higher performance and/or more efficient at executing the subset of the instructions than the processor. Alternatively, instructions can be added to the instruction set that are specifically designed to be executed by the coprocessor, using specialized hardware that a general purpose processor would not implement.

The coprocessor generally executes instructions independently once they are dispatched to the coprocessor, and in some cases the coprocessor may even implement out of order execution of the instructions. The instruction set often includes synchronizing instructions for the coprocessor that can help the processor determine when a sequence of coprocessor instructions has started and finished. For example, in some cases, the coprocessor can be powered down or placed in a low power mode if it is not executing instructions. The synchronizing instructions can include instructions that initialize a state in the coprocessor at the start of a coprocessor sequence and delete the state at the end of the sequence. The initializing instruction can be defined to execute prior to any of the instructions in the sequence (and subsequent to any instructions from previously dispatched sequences, if any), and the concluding instruction can be defined to execute subsequent to the instructions in the sequence. Thus, the synchronizing instructions can have a full barrier effect on the coprocessor sequences. However, in cases where the coprocessor sequences are often relatively short sequences having few instructions, the barrier effect can reduce performance and efficiency.

BRIEF DESCRIPTION OF THE DRAWINGS

The following detailed description refers to the accompanying drawings, which are now briefly described.

FIG. 9 is a block diagram of one embodiment of a computer accessible storage medium.

Figure 1:
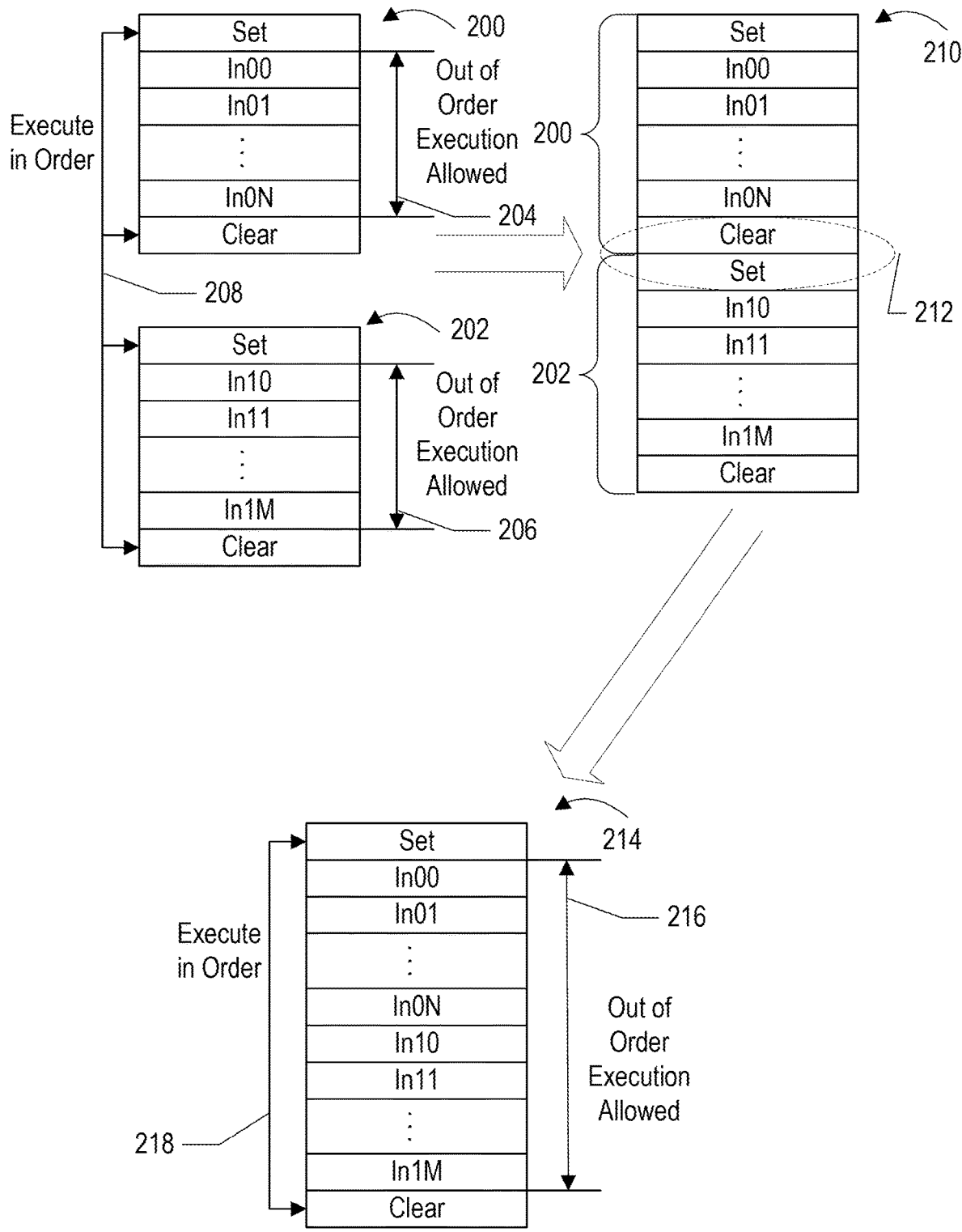
FIG. 1 is a block diagram illustrating coprocessor sequences.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description.

DETAILED DESCRIPTION OF EMBODIMENTS

An instruction set architecture including instructions for a processor and instructions for a coprocessor may include synchronizing instructions that may be used to begin and end instruction sequences that include coprocessor instructions (coprocessor sequences). One synchronizing instruction, referred to herein as a "set" instruction, may be defined to initialize coprocessor state to indicate that a coprocessor routine is in execution. The other synchronizing instruction, referred to herein as "clear" instruction, may invalidate the coprocessor state to indicate that the coprocessor routine is complete. For example, as implied by the instruction names, the coprocessor state may be a bit that may be set to indicate that a coprocessor routine is in execution and clear to indicate that the coprocessor routine is not in execution. Other embodiments may reverse the meanings of the set and clear states of the bit, or may use multi-bit state. In an embodiment, the coprocessor may support multiple contexts (independent sets of state in the coprocessor for independent code sequences) and the processor state initialized by the set instruction and invalidated by the clear instruction may be context-specific. That is, there may be separate coprocessor state for each supported context. The set and clear instruction may be synchronizing for instructions executing in the same context.

The coprocessor state may be used to determine whether or not the coprocessor may be powered down, for example. That is, if there is not a coprocessor sequence currently in execution, then the coprocessor may be powered down but if there is a coprocessor sequence currently in execution, then the coprocessor should generally not be powered down (although there may be exceptions). The coprocessor state may be used, e.g., even when the coprocessor may appear idle during execution of a coprocessor sequence, e.g. if there are delays in the processor issuing the coprocessor instructions to the coprocessor.

To ensure that the coprocessor state is initialized and invalidated correctly with respect to instruction execution within the sequence, the set and clear instructions may be synchronizing. That is, the set instruction may be defined to be executed prior to one or more other coprocessor instructions and the clear instruction. The clear instruction may be defined to be executed after the set instruction and the one or more other coprocessor instructions. The one or more other coprocessor instructions may be executed out of order or in order, or in any desired order that produces the same result as executing the instructions in order produces. With respect to instruction execution, out of order and in order may refer to the order of instructions in the instruction sequence.

FIG. 1 is a block diagram illustrating example coprocessor sequences 200 and 202. The coprocessor sequence 200 includes a set instruction, various other instructions In01 to In0N, and a clear instruction. Similarly, the coprocessor sequence 202 includes a set instruction, various other instructions In10 to In1M, and a clear instruction. The instructions of a given instruction sequence 200/202 (except for the set and clear instructions) may execute out of order with respect to each other (arrows 204 and 206, respectively) if the coprocessor supports out of order execution. However, the instructions in the given instruction sequence 200/202 execute after the set instruction and before the clear instruction that are in the same sequence. Similarly, the set and clear instructions themselves may be executed in order (arrows 208 in FIG. 1).

At reference numeral 210, the coprocessor sequences 200 and 202 are illustrated as they might appear in an instruction buffer in the coprocessor. That is, the coprocessor sequence 200 may be in the instruction buffer, followed by the instruction sequence 202. Accordingly, the clear instruction that terminates the coprocessor sequence 200 may be in the instruction buffer adjacent to the set instruction that starts the instruction sequence 202. The adjacent instructions are shown via the dotted oval 212. It is noted that reference numeral 210 is somewhat conceptual in that not all of the instructions need be in the instruction buffer at the same time. That is, the set instruction and early instructions In10, In11, etc. of the coprocessor sequence 202 may be issued from the instruction buffer for execution in the coprocessor before other instructions arrive. However, the clear instruction and set instruction at reference numeral 212 may often be in the instruction buffer at the same time, especially if a given task being executed by the processor includes multiple relatively short coprocessor sequences.

Since the clear instruction invalidates the coprocessor state and the set instruction subsequently initializes the state again, the inventors have realized that an optimization is possible in which the clear instruction followed by the set instruction may be suppressed if they are in a buffer or queue in the coprocessor at the same time. The suppression is indicated at reference numeral 214 in FIG. 1, where the clear and set instructions at reference numeral 212 have been removed. The instructions from both coprocessor sequences (In00 to In0N and In10 to In1M) may be executed out of order among themselves (arrow 216), while the initial set instruction and the final clear instruction may be executed in order with respect to each other (arrow 218). While the example in FIG. 1 shows one instance of a clear instruction followed by a set instruction removed, there may generally be no limit to the number of occurrences of clear instruction followed by set instruction that may be suppressed in such situations (although there may be hardware limitations in some cases, discussed in more detail below).

Generally, suppressing the execution of an instruction such as a set or clear instruction may be implemented in any number of ways. The instructions may actually be deleted from an instruction buffer or other queue, for example. Alternatively, the instructions may be issued but may not be executed (e.g. a "no operation" or "no-op"). Still further, the instructions may be issued and executed, but without their synchronizing effects and without clearing the processor state that indicates that a coprocessor sequence is being executed.

Since the set instruction is an initial instruction of a coprocessor sequence, it may be referred to as an initial synchronizing instruction. Similarly, since the clear instruction is the last instruction in the coprocessor sequence, it may be referred to as a final synchronizing instruction. Additionally, other forms of the synchronizing instructions are contemplated that have the synchronizing effects of the set and clear instructions, but do not change processor state to indicate execution/completion of the sequence in the way that the set and clear instructions do. Accordingly, in an embodiment, a coprocessor sequence may comprise an initial synchronizing instruction followed by one or more other coprocessor instructions and terminated by a final synchronizing instruction. It is noted that a coprocessor sequence may be intermingled with other non-coprocessor instructions that are executed by a corresponding processor directly. Such non-coprocessor instructions may not be affected by the synchronizing instructions, in an embodiment.

Figure 2:
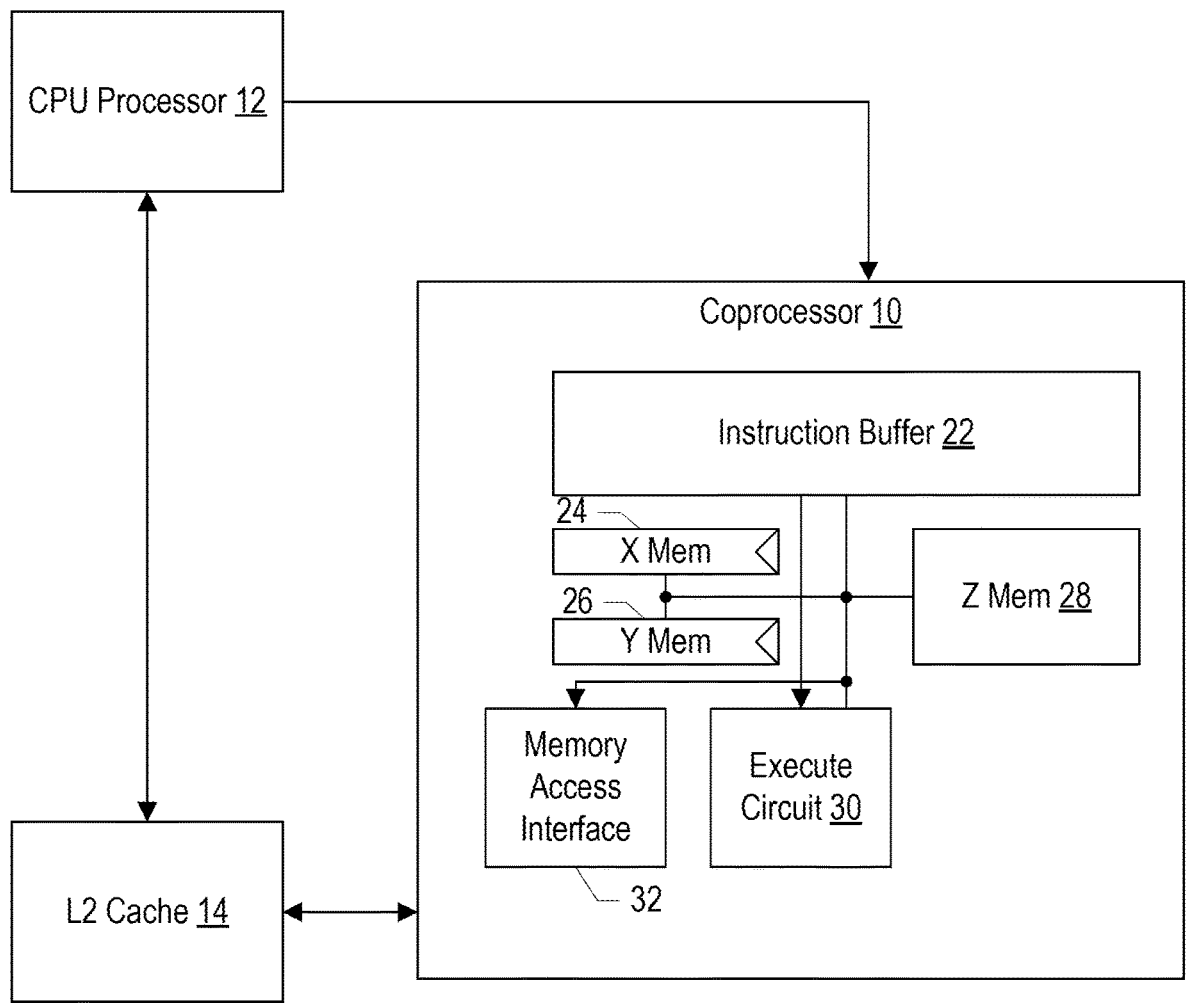
FIG. 2 is a block diagram of one embodiment of a system including a processor and a coprocessor.

Turning now to FIG. 2, a block diagram of one embodiment of an apparatus including a CPU processor 12, a coprocessor 10, and a level two (L2) cache 14 is shown. In the illustrated embodiment, the CPU processor 12 is coupled to the L2 cache 14 and the coprocessor 10. In some embodiments, the coprocessor 10 may be coupled to the L2 cache 14 as well, and/or may be coupled to a data cache (DCache) in the CPU processor 12 (not shown in FIG. 2). The coprocessor 10 may include an instruction buffer 22, an X memory 24, a Y memory 26, a Z memory 28, an execute circuit 30, and a memory access interface 32 coupled to each other. In some embodiments, circuits may be coupled if they are electrically coupled (e.g. directly connected or indirectly connected through one or more other circuits) and/or communicatively coupled.

The coprocessor 10 may be configured to perform one or more computation operations and one or more coprocessor load/store operations. The coprocessor 10 may employ an instruction set, which may be a subset of the instruction set implemented by the CPU processor 12. The CPU processor 12 may recognize instructions implemented by the coprocessor 10 and may issue the instructions to the coprocessor 10 for execution. Any mechanism for transporting the coprocessor instructions from the processor 12 to the coprocessor 10 may be used. For example, FIG. 2 illustrates a communication path between the CPU processor 12 and the coprocessor 10. The path may be a dedicated communication path, for example if the coprocessor 10 is physically located near the CPU processor 12. The communication path may be shared with other communications. For example, a packet-based communication system could be used to transmit memory requests to the system memory and instructions to the coprocessor 10. In one particular embodiment, coprocessor instructions may be communicated through the L2 cache 14 to the coprocessor 12. In an embodiment, instructions may be bundled and transmitted to the coprocessor 12. For example, cache operations, cache evictions, etc. may be transmitted by the processor 12 to the L2 cache 14, and thus there may be an interface to transmit an operation and a cache line of data. The same interface may be used, in an embodiment, to transmit a bundle of instructions to the coprocessor 10 through the L2 cache 14.

In one embodiment, the computation operations specified by the instructions implemented in the coprocessor 10 may be performed on vectors of input operands. For example, an embodiment receives vectors of operands from the X memory 24 and the Y memory 26. The execute circuit 30 may include an array or grid of processing elements (circuits) to perform the operations. Each circuit may receive one or more of the vector of elements from the X memory 24 and one or more of the vector of elements from the Y memory 26, and may evaluate the operation on the vector elements. In an embodiment, the result of the operation may be accumulated with the current value in a corresponding location in the Z memory 28, for write back to the corresponding location in the Z memory 28. In an embodiment, the instructions executed by the coprocessor 10 may have a vector mode and a matrix mode. In the vector mode, each vector element of X is evaluated against a corresponding vector element of Y, producing a vector of results. In the matrix mode, an outer product of the input vector operands may be computed in one embodiment. In still another embodiment, various matrix operations may be supported using in the matrix mode, and each vector element of X may be operated upon with each vector element of Y in the matrix mode.

Based on the location of a given processing element in the array, there is a subset of the Z memory 28 that the processing element may update in response to coprocessor instructions. That is, each processing element produces a portion of the overall result of an instruction. The result produced over all of the processing elements (or a subset of the processing elements, if an instruction specifies fewer than all of the processing elements to perform an operation) is the result of the instruction, and the result is written to locations in the Z memory that are dispersed over the address space of the Z memory in a regular pattern that depends on the instruction and the operand size of the instruction. Up to all of the Z memory 28 may be updated in response to an instruction, but each processing element updates a restricted portion of the Z memory 28 (and that processing element may be the only processing element in the execute circuit 30 that may update the restricted portion). The instruction may specify a Z memory address for the result, and the address identifies the location(s) within the restricted portion that are updated.

In one embodiment, the Z memory 28 may thus be physically distributed over an area of the integrated circuit that is occupied by the coprocessor 10, along with the processing elements of the execute circuit 30. Thus, the depiction in FIG. 2 may be a logical diagram of the coprocessor 10, and the physical implementation may include distributing the Z memory 28 with the processing elements. Physically distributing the Z memory 28 may provide various benefits, in some embodiments. For example, the wiring to connect the Z memory 28 to the processing elements in the execute circuit 30 may be relatively short and compact as compared to if the Z memory 28 were implemented separately. This may lead to savings in area consumed, as well as power in reading and writing the Z memory 28.

In an embodiment, the coprocessor 10 may support various data types and data sizes (or precisions). For example, floating point and integer data types may be supported. The floating point data type may include 16-bit, 32-bit, and 64-bit precisions. The integer data types may include 8-bit and 16-bit precisions, and both signed and unsigned integers may be supported. Other embodiments may include a subset of the above precisions, additional precisions, or a subset of the above precisions and additional precisions (e.g., larger or smaller precisions). In an embodiment, 8-bit and 16-bit precisions may be supported on input operands, and 32-bit accumulations may be supported for the results of operating on those operands.

In an embodiment, the coprocessor load operations may transfer vectors from a system memory (not shown in FIG. 2) to the X memory 24, Y Memory 26, or Z memory 28. The coprocessor store operations may write the vectors from the X and Y memories 24 and 26 to system memory. The Z memory 28 may be written to memory using an extract instruction to move the results to the X memory 24 and/or the Y memory 26, and then storing the results from the X memory 24 and/or the Y memory 26 to system memory. Alternatively, a store instruction to store the Z memory 28 to main memory may also be supported. The system memory may be formed from a random access memory (RAM) such as various types of dynamic RAM (DRAM) or static RAM (SRAM). A memory controller may be included to interface to the system memory. In an embodiment, the coprocessor 10 may be cache coherent with the CPU processor 12. In an embodiment, the coprocessor 10 may have access to the L2 cache 14, and the L2 cache 14 may ensure cache coherency with the CPU processor 12 caches. In yet another alternative, the coprocessor 10 may have access to the memory system, and a coherence point in the memory system may ensure the coherency of the accesses. In yet another alternative, the coprocessor 10 may have access to the CPU caches. In still another embodiment, the coprocessor 10 may have one or more caches (which may be virtually addressed or physically addressed, as desired). The coprocessor caches may be used if an L2 cache 14 is not provided and access to the CPU caches is not provided. Alternatively, the coprocessor 10 may have the caches and access to the L2 cache 14 for misses in those caches. Any mechanism for accessing memory and ensuring coherency may be used in various embodiments.

The CPU processor 12 may be responsible for fetching the instructions executed by the CPU processor 12 and the coprocessor 10, in an embodiment. In an embodiment, the coprocessor instructions may be issued by the CPU processor 12 to the coprocessor 10 when they are no longer speculative. Generally, an instruction or operation may be non-speculative if it is known that the instruction is going to complete execution without exception/interrupt or flush due to incorrect speculation (e.g., branch misprediction). Thus, an instruction may be non-speculative once prior instructions (in program order) have been processed to the point that the prior instructions are known to not cause exceptions/ speculative flushes in the CPU processor 12 and the instruction itself is also known not to cause an exception/speculative flush. Some instructions may be known not to cause exceptions based on the instruction set architecture implemented by the CPU processor 12 and may also not cause speculative flushes. Once the other prior instructions have been determined to be exception-free and flush-free, such instructions are also exception-free and flush-free.

The instruction buffer 22 may be provided to allow the coprocessor 10 to queue instructions while other instructions are being performed. In an embodiment, the instruction buffer 22 may be a first in, first out buffer (FIFO). That is, instructions may be processed in program order. Other embodiments may implement other types of buffers, multiple buffers for different types of instructions (e.g. load/ store instructions versus compute instructions) and/or may permit out of order processing of instructions.

The X memory 24 and the Y memory 26 may each be configured to store at least one vector of input operands. Similarly, the Z memory 28 may be configured to store at least one computation result generated from a vector of operands from the X memory 24 and a vector of operands from the Y memory 26. The result may be a matrix of results at the result size (e.g., 16-bit elements, 32-bit elements, or 64-bit elements). Alternatively, the result may be a vector, depending on the instruction. In some embodiments, the X memory 24 and the Y memory 26 may be configured to store multiple vectors and/or the Z memory 28 may be configured to store multiple result matrices/vectors. Each vector/matrix may be stored in a different bank in the memories, and operands for a given instruction may be identified by bank number. More generally, each entry in the memories 24, 26, and 28 may be addressed by a register address (e.g., register number) and thus the entries in the memories may be viewed as registers, similar to an integer or floating point register in the CPU processor 12 (although generally significantly larger than such a register in terms of storage capacity). Viewed in another way, each of the memories 24, 26, and 28 may be addressable as entries using addresses that are referenced to the particular memory (e.g. each memory 24, 26, and 28 may have its own address space). A given address of a given entry in the X memory 24, for example, may have the same numerical value as a second given address of a second given entry in the Y memory 26. Because they are coded in a given instruction as an X memory address or a Y memory address, the correct entry from the correct memory to be read/written may be selected by the coprocessor 10.

The execute circuit 30 may be configured to perform the computation operations, as previously mentioned. The memory access interface 32 may be configured to perform the coprocessor load/store operations. The coprocessor 10 may provide the coprocessor load/store operations from the instruction buffer 22 to the memory access interface 32, which may include a queue for the load/store operations and control logic to select the load/store operations for execution. The address of the coprocessor load/store operations may be provided with the operation from the CPU processor 12. In one embodiment, the CPU processor 12 may generate a virtual address from one or more address operands of the load/store operation, and may translate the virtual address to a physical address through a memory management unit (e.g. a translation lookaside buffer (TLB) and/or related hardware). In another embodiment, the coprocessor 10 may include a TLB and/or other MMU hardware, and the CPU processor 12 may provide a virtual address which may be translated by the coprocessor 10. TLB management instructions executed by the CPU processor 12 may also be transmitted to the coprocessor 10 in such embodiments, to manage the coprocessor 10 TLB coherently with the CPU processor 12 TLB. However, for coprocessor store operations, the source data from one of the memories 24, 26, and 28 may not be available until prior compute operations have been completed. Coprocessor load operations may generally be ready for execution when provided to the memory access interface 32, but may have ordering constraints with younger coprocessor load/store operations. The memory access interface 32 may be configured to resolve the ordering constraints and transmit the memory operations to the L2 cache 14.

In an embodiment, the L2 cache 14 may be configured to check for a cache hit for the coprocessor load/store operations, and may also determine if the data (or a portion thereof) accessed by the coprocessor load/store operations is in a data cache in the CPU processor 12. The L2 cache 14 may be inclusive of the CPU processor data cache, and thus the tag for the cache line in the L2 cache 14 may indicate if the cache line is in the data cache. Alternatively, the L2 cache 14 may include a set of tags for the data cache and may track which cache blocks are in the data cache in the set of tags. If the data is in the data cache, the L2 cache 14 may generate an operation to invalidate the data cache line (and fetch the data if it is modified). This operation may be referred to as a "back snoop" operation. Additionally, the L2 cache 14 may detect a cache miss for a coprocessor load/store operation, and may fetch the missing cache line from another lower level cache or the main memory to complete the request.

A cache line may be the unit of allocation/deallocation in a cache. That is, the data within the cache line may be allocated/deallocated in the cache as a unit. Cache lines may vary in size (e.g. 32 bytes, 64 bytes, 128 bytes, or larger or smaller cache lines). Different caches may have different cache line sizes (e.g. the data cache in the CPU processor 12 may have a smaller cache line size than the L2 cache 14, in an embodiment). Each cache may have any desired capacity, cache line size, and configuration. The L2 cache 14 may be any level in the cache hierarchy (e.g. the last level cache (LLC) for the CPU processor 12, or any intermediate cache level between the CPU processor 12/coprocessor 10 and the main memory system). There may be more levels of cache between the CPU caches and the L2 cache 14, and/or there may be additional levels of cache between the L2 cache 14 and the main memory.

It is noted that the coprocessor 10 may be illustrated in simplified form, in an embodiment, and may include additional components not shown in FIG. 2. For example, the coprocessor 10 may include a pipeline to decode coprocessor operations, perform register renaming on the operands, use a physical memory size for the X memory 24 and Y memory 26 that is larger than the architected size, and execute computation operations out of order. Any implementation of the coprocessor 10 may be used in various embodiments.

It is noted that, in some embodiments, the coprocessor 10 may be shared by multiple CPU processors 12. The coprocessor 10 may maintain separate contexts in the X memory 24, Y memory 26, and Z memory 28 for each CPU processor 12, for example. Alternatively, contexts may be swapped in the coprocessor 10 when different CPU processors 12 issue coprocessor operations to the coprocessor 10.

Figure 3:
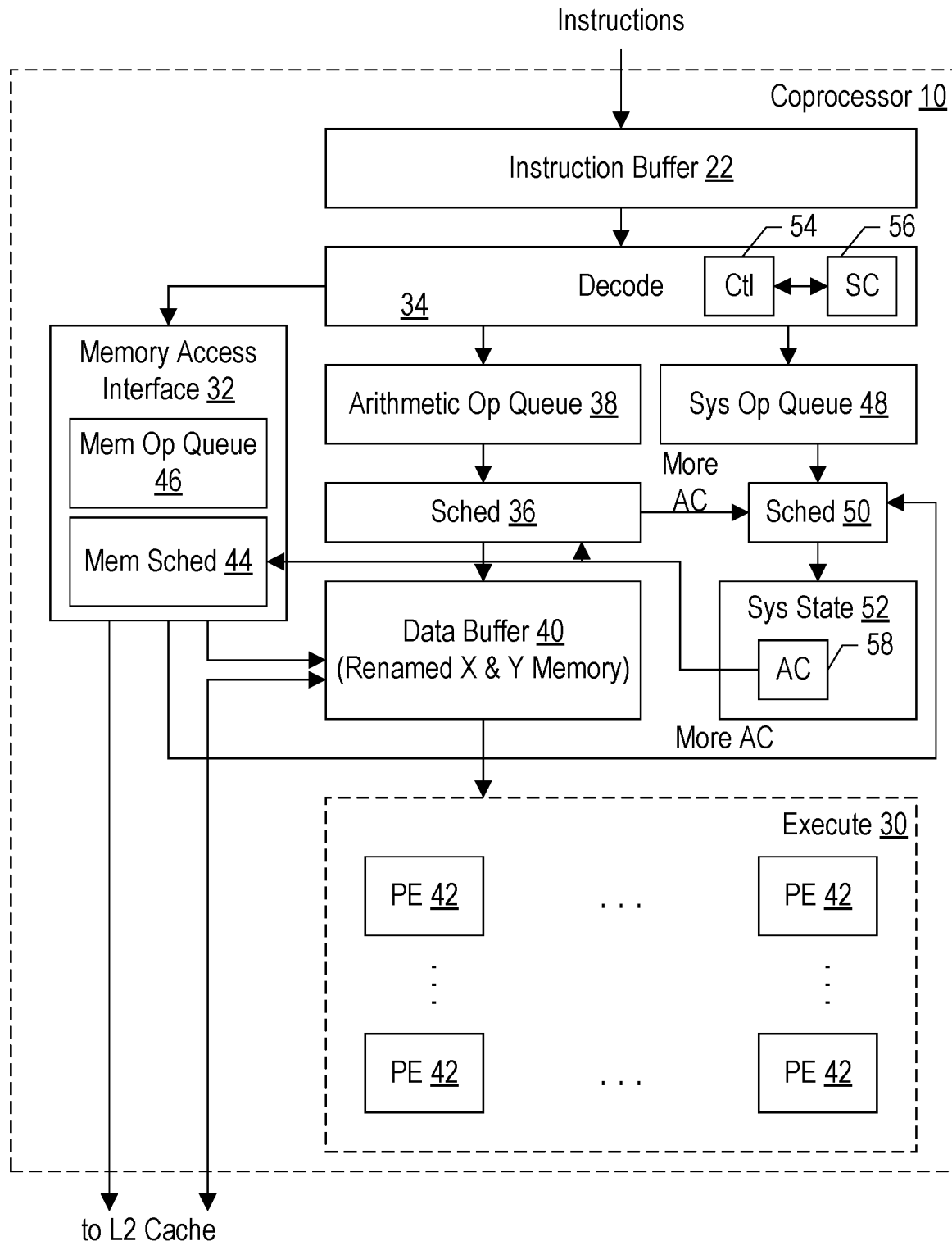
FIG. 3 is a block diagram of one embodiment of the coprocessor in greater detail.

FIG. 3 is a block diagram of one embodiment of the coprocessor 10 in greater detail. In the illustrated embodiment, the coprocessor 10 includes the instruction buffer 22, a decode unit 34, the memory access interface 32, an arithmetic operation (op) queue 38, a data buffer 40, the execute circuit 30, a scheduler circuit 36, a system (sys) op queue 48, a scheduler 50, and a sys state storage 52. The execute circuit 30 includes an array of processing elements (PEs) 42, arranged as a grid of rows and columns. The instruction buffer 22 is coupled to receive instructions to be executed by the coprocessor 10, and is coupled to the decode unit 34. The decode unit 34 includes a control circuit 54 and a speculative color storage device 56. The decode unit 34 is coupled to the arithmetic op queue 38, which is further coupled to the data buffer 40. The decode unit 34 is further coupled to the sys op queue 48, which is coupled to the scheduler 50. The scheduler 50 is further coupled to the sys state storage 52, which stores an architectural color 58. The data buffer 40 is coupled to the execute circuit 30. The data buffer 40 is coupled to the memory access interface 32, and both the memory access interface 32 and the data buffer 40 are coupled to the L2 cache 14. The memory access interface 32 includes a memory op queue 46 and a memory scheduler 44. The scheduler 36 and the memory scheduler 44 are coupled to the architectural color 58, and are coupled to the scheduler 50.

Generally, the coprocessor 10 may be configured to receive instructions in the instruction buffer 22. The decode unit 34 may decode the instructions into one or more operations (ops) for execution. The ops may include compute ops that are executed in the execute circuit 30, memory ops to read data from memory into the data buffer 40 and store data from the data buffer 40 to memory (via the L2 cache 14), and other ops that update the system state 52 (which may control various modes of operation and the like). Among other things, the system state 52 may include the coprocessor state that is affected by the set and clear instructions described above.

The coprocessor 10 may also support the concept of "colors," which may be used to differentiate between instructions (and ops decoded from the instructions) in the same context that are before or after set and clear instructions. The colors may be values assigned to instructions to identify the instructions/ops that are part of the same coprocessor sequence, delineated by set and clear instructions. Logically, the color may be incremented for each set or clear instruction encountered in an instruction sequence. The instructions having colors assigned before a given set instruction are thus expected to execute before the given set instruction based on the given set instruction's synchronization property. The set instruction itself may be assigned the most recent color, and may increment the color as well. Thus, instructions after the set have a later color than the set instruction and are expected to execute after the given set instruction based on the given set instruction's synchronization property. Similarly, the instructions having the same color as a given clear instruction are expected to execute before the given clear instruction and instructions have colors assigned after the given clear instruction may be expected to execute after the given clear instruction.

The colors may be used to ensure that the ops that are before a given synchronizing instruction have executed prior to the given synchronizing instruction. For example, the architectural color (AC) 58 may be the color corresponding to the most recently executed (or suppressed, as discussed in more detail below) synchronizing instruction. That is, the color may be the color generated in response to the most recently executed (or suppressed) synchronizing instruction. The AC 58 may be broadcast to the scheduler circuits for each execution unit (e.g. the scheduler 36 and the memory scheduler 44). Each of the schedulers 36 and 44 may provide an indication of whether or not the schedulers have additional ops to execute that have the same color as the AC 58 ("more AC" shown in FIG. 3) or an older color than the architectural color, as described in more detail below. The scheduler 50 may prevent the next synchronizing instruction from executing until the indications from each scheduler 36 and 44 indicate that there are no more ops having the same color as the AC 58. Once both schedulers 36 and 44 have so indicated, the next synchronizing op from the sys op queue 48 may be executed, updating the coprocessor state to indicate sequence in execution or sequence not in execution, as appropriate, and incrementing the AC 58.

Additionally, the scheduler 50 may be configured to detect a clear instruction followed by a set instruction for another coprocessor sequence in adjacent entries in the sys op queue 48. Based on such detection, the scheduler 50 may suppress execution of both instructions (and thus the coprocessor state may still indicate "coprocessor sequence in execution). Additionally, based on such detection, the scheduler 50 may increment the AC 58 by two to reflect the two suppressed instructions. It is noted that the color values are a fixed number of bits in width, and thus there is a maximum number of set/clear instructions that may be outstanding in the coprocessor 10. If the maximum number is reached, then incrementing the color would result in aliasing by assigning the same color to a set or clear instruction in the instruction buffer 22 as a color that is still associated with earlier instructions in the coprocessor 10. In such a case, the decode unit 34 may stall a set or clear instruction in the instruction buffer 22 until the earlier instructions are completed and a color become available for assignment to the set or clear instruction.

The decode unit 34 may maintain the speculative color value (SC) 56, via the control circuit 54. As the decode unit 34 decodes instructions, the control circuit may detect set/clear instructions and may increment the SC 56. The SC 56 may be provided with each op dispatched by the decode unit 34 to the queues 46, 38, and 48. The SC 56 may be compared to the AC 58 to determine if the corresponding op is before or after the most recently executed synchronizing op.

In one embodiment, the data buffer 40 may be the source of operands for compute ops executed by the execute circuit 30, and results may be stored in the distributed Z memory 28 within the execute circuit 30 (not shown in FIG. 3). That is, the data buffer 40 may include the storage for the X memory 24 and the Y memory 26. The entries from the X memory 24 and the Y memory 26 may be renamed by the decode unit 34 to various entries in the data buffer 40 using register renaming techniques. The Z memory 28 may not be renamed, in this embodiment.

As mentioned previously, the coprocessor 10 may be designed to execute instructions which specify vectors of operands and a compute (arithmetic/logic unit (ALU)) operation to be performed on the operands. For example, various types of multiply/accumulate operations may be supported. The multiplications may be performed in parallel on the vectors of operands. Thus, the execute circuit 30 includes an array of processing elements (PEs) 42. The array of PEs 42 may include a horizontal direction (row) and a vertical direction (column), as illustrated in FIG. 3. Each PE 42 may receive an operand from one or more input vector elements for an op, and may perform the specified compute operation on the operands to produce a result. Some ops may specify a vector of results, and a subset of the PEs 42 may be used for such ops. Other ops may specify an array (or matrix) of results. For example, in an embodiment, the multiply-accumulate operations over the vectors of input operands may produce an outer product of the vectors. Other multiply-accumulate operations may be performed in matrix mode for such embodiments. Up to all of the PEs 42 may be used for matrix-mode ops. However, in some cases, even the array of results may not use all of the PEs 42. For example, in some cases, not all of the vector of input operands may be used.

In an embodiment, for matrix operations, the vector of operands from the Y memory 26 may be provided as a "column" to the execute circuit 30 and the vector of operands from the X memory 24 may be provided as a "row" to the execute circuit 30. Thus, a given vector element from the X memory 24 may be supplied to a column of PEs 42, and a given vector element from the Y memory 26 may be supplied to a row of PEs 42 for a matrix operation. Because different operand sizes are supported, the number of vector elements supplied to a given PE 42 depends on the operand size of the instruction. For example, if the execute circuit 30 has N PEs 42 in a row or column, each PE 42 may receive 1/Nth of the data from an entry. The number of operands in the data, and thus the number of operations performed by the PE 42 for a given instruction, may depend on the operand size of the instruction. In one embodiment, largest operand size may be 1/Nth of the data from an entry (e.g. each PE 42 may operate on one operand at the largest operand size). The operand sizes vary by a power of 2, so each PE 42 may operate on two operands of the second largest operand size, four operands of the third largest operand size, etc.

An issued arithmetic op may read their source operands from the data buffer 40 and progress to the PEs 42 in the execute circuit 30 for execution. The PEs 42 may perform the specified operation, generating results and writing the results to the local Z memory locations implemented at the PEs 42.

Similar to the scheduler circuit 36, the memory scheduler circuit 44 may wait for the source operands of the memory ops to be ready and issue the memory ops. The memory scheduler circuit 44 may ensure that memory ops to the same address are issued in program order (e.g. using dependency vectors or other mechanisms based on comparing the addresses accessed by the memory ops). The source operands may be store data for store memory ops. Load memory ops may not have specific source operands, since the memory addresses are provided by the CPU processor 12 in this embodiment. However, load memory ops may still be scheduled based on address dependencies, if any. The store ops may read their source operands from the data buffer 40, which may transit the data to the L2 cache 14 along with the memory op/address from the memory access interface 32. For load ops, the L2 cache 14 may provide data to the data buffer 40 (and the address at which the data is to be written, which may be transmitted to the L2 cache 14 by the memory access interface 32 when transmitting the load ops). The writing of the load op data to the data buffer 40 may also be communicated to the op queue 38/decode unit 34, to indicate that source data in those memory locations is now available.

Figure 4:
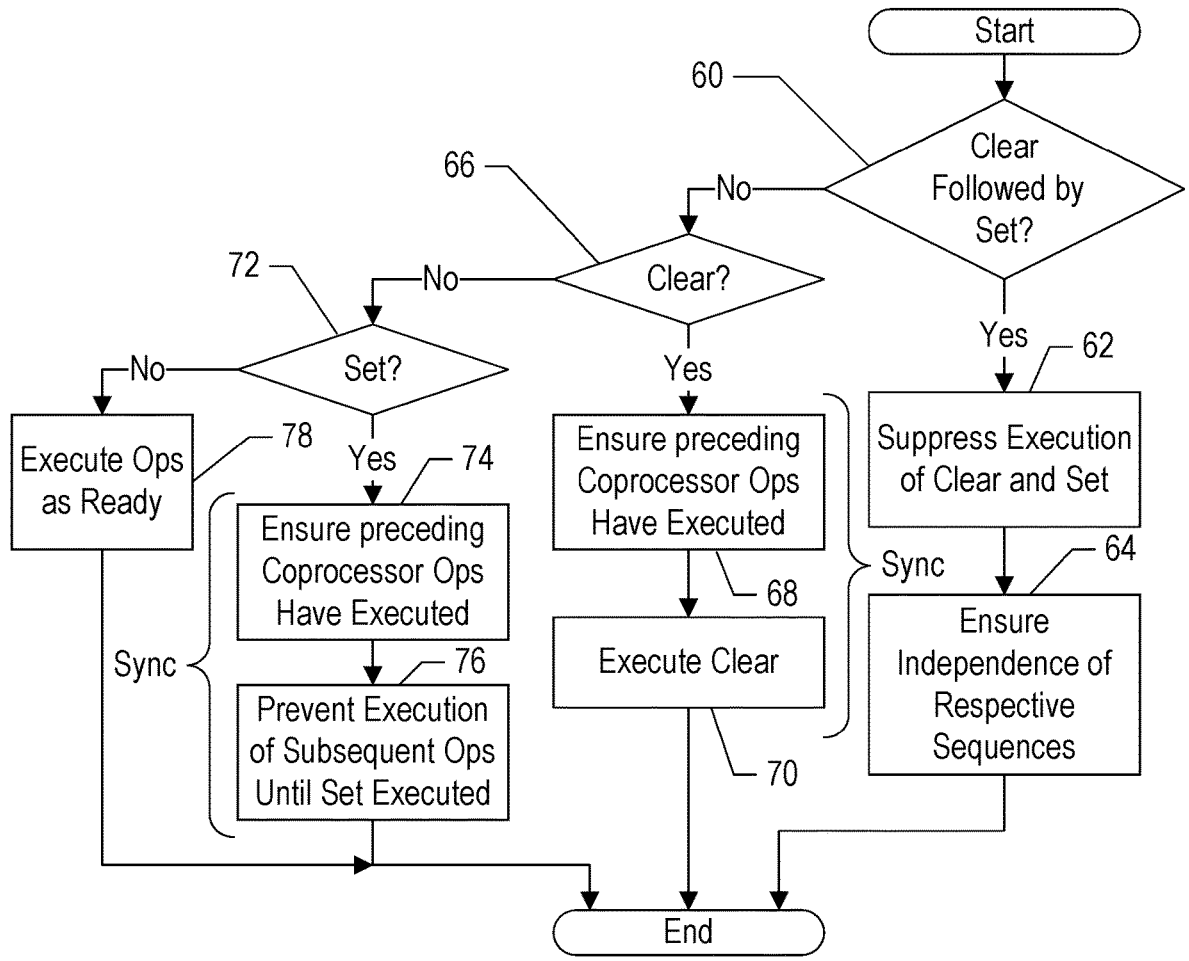
FIG. 4 is a flowchart illustrating operation of one embodiment of a coprocessor at a general level for implementing synchronizing instructions.

FIG. 4 is a flowchart illustrating operation of one embodiment of the coprocessor 10 for executing synchronizing instructions. While the blocks are shown in a particular order for ease of understanding, other orders may be used. Blocks may be performed in parallel in combinatorial logic circuitry in the coprocessor 10. Blocks, combinations of blocks, and/or the flowchart as a whole may be pipelined over multiple clock cycles. The coprocessor 10 may be configured to implement the operation shown in FIG. 4.

The coprocessor 10 may be configured to detect a clear instruction followed by a set instruction (decision block 60, "yes" leg). Based on the detection, the coprocessor 10 may be configured to suppress execution of the clear instruction and the set instruction (block 62). The coprocessor 10 may also ensure that dependencies between the respective coprocessor sequences are respected, whether through memory (stores and loads to the same address) or registers (e.g. the sequence terminated by the clear instruction and the sequence initiated by the following set instruction may respect dependencies) (block 64).

The coprocessor 10 may be configured to detect a clear instruction that is not followed by a set instruction (at least at the point in time when the clear instruction is ready to execute) (decision block 66, "yes" leg). Based on the detection, the coprocessor 10 may ensure that preceding coprocessor instructions (ops) have executed (block 68) and then may execute the clear instruction (block 70), invalidating the "coprocessor sequence in progress" state in the sys state 52. Together, blocks 68 and 70 may comprise synchronizing the instruction execution with respect to the clear instruction (illustrated as the curly braced "sync" around these blocks in FIG. 4).

The coprocessor 10 may be configured to detect a set instruction that is not preceded by a clear instruction at the point in time when the set instruction is ready to execute (decision block 72, "yes" leg). Based on the detection, the coprocessor 10 may ensure that preceding coprocessor instructions (ops) have executed (block 74) and may prevent execution of subsequent ops until the set instruction has executed (block 76), initializing the "coprocessor sequence in progress" state in the sys state 52. Together, blocks 74 and 76 may comprise synchronizing the instruction execution with respect to the clear instruction (illustrated as the curly braced "sync" around these blocks in FIG. 4).

If there is no set or clear instruction waiting for execution (decision blocks 60, 66, and 72, "no" legs), the coprocessor 10 may execute ops as they become ready for execution (block 78).

Figure 5:
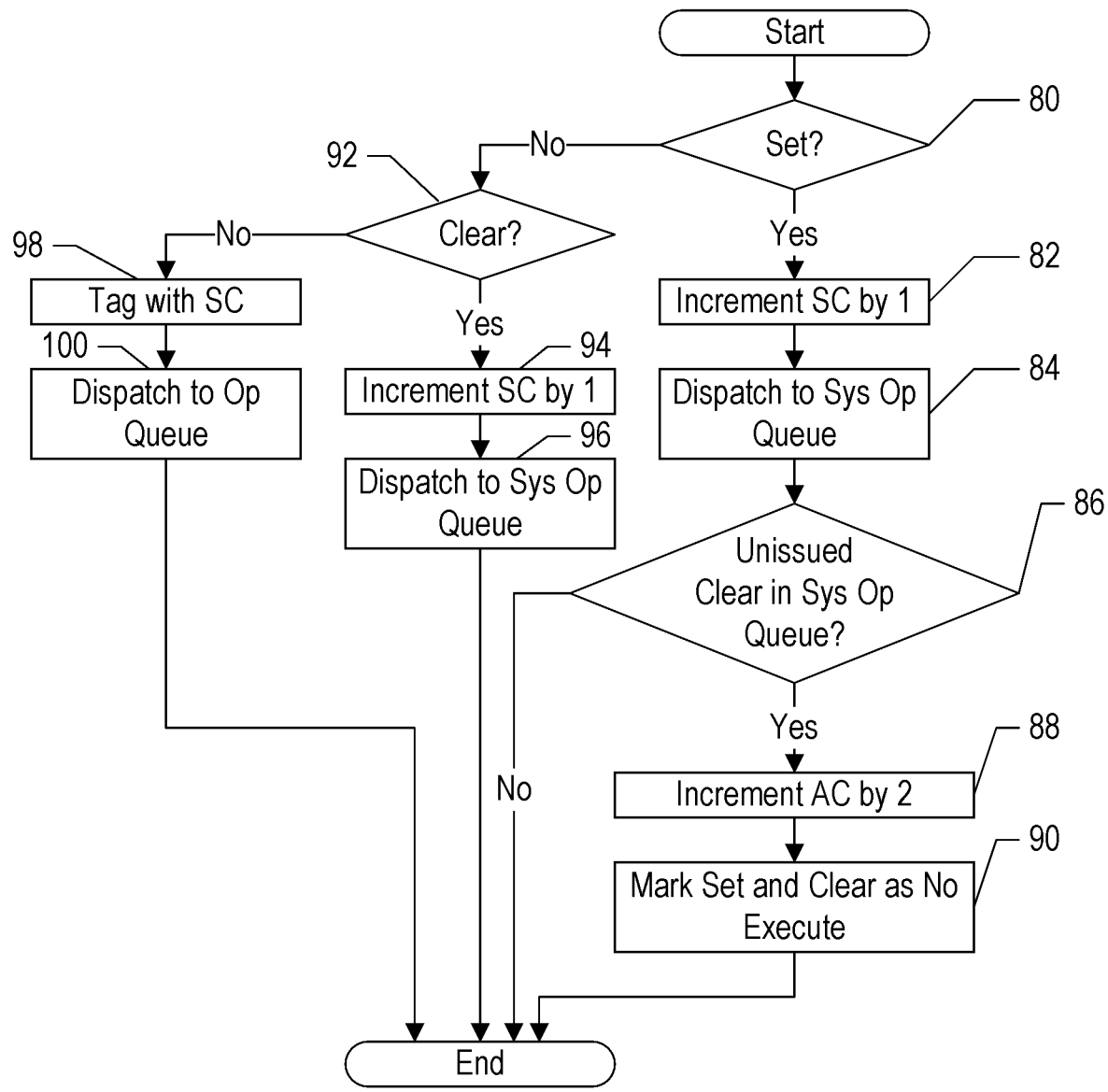
FIG. 5 is a flowchart illustrating operation of one embodiment of the coprocessor when synchronizing instructions are encountered in instructions provided to the coprocessor by the processor.

FIG. 5 is a flowchart illustrating operation of one embodiment of the coprocessor 10 when synchronizing instructions are encountered in instructions provided to the coprocessor 10 by the processor 12 implementing the "color" scheme described above. While the blocks are shown in a particular order for ease of understanding, other orders may be used. Blocks may be performed in parallel in combinatorial logic circuitry in the coprocessor 10. Blocks, combinations of blocks, and/or the flowchart as a whole may be pipelined over multiple clock cycles. The coprocessor 10 may be configured to implement the operation shown in FIG. 5.

If the decode unit 34 decodes a set instruction (decision block 80, "yes" leg), the control circuit 54 may be configured to increment the SC 56 by one (block 82) and may be configured to dispatch the set instruction to the sys op queue 48 (block 84). In an embodiment, the set instruction itself may be tagged with the current SC 56 (prior to the increment). If the sys op queue 48 has an unissued clear instruction (decision block 86, "yes" leg), the scheduler 50 may be configured to increment the AC 58 by 2 and may be configured to mark the set and clear instructions as "no execute" (blocks 88 and 90). If the decode unit 34 decodes a clear instruction (decision block 92, "yes" leg), the control circuit 54 may be configured to increment the SC 56 by 1 (block 94) and may be configured to dispatch the clear instruction to the sys op queue 48 (block 96). In an embodiment, the clear instruction itself may be tagged with the current SC 56 (prior to the increment). If the decode unit 34 decodes an instruction that is not a set or clear instruction (decision blocks 80 and 92, "no" legs), the decode unit 34 may tag the decoded op(s) with the SC 56 and may dispatch the ops to the ops queues 38 and/or 46 as appropriate (blocks 98 and 100).

Figure 6:
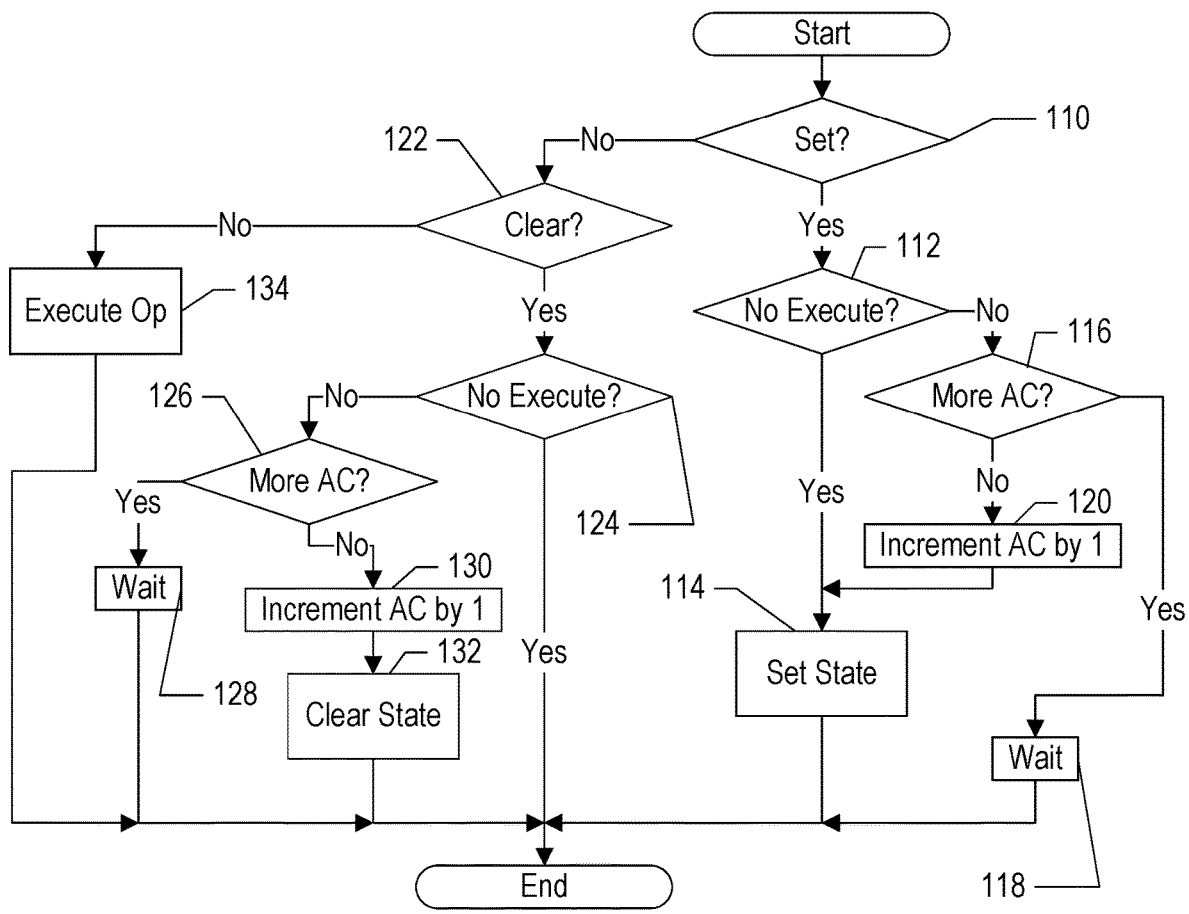
FIG. 6 is a flowchart illustrating operation of one embodiment of a system instruction scheduler circuit in the coprocessor.

FIG. 6 is a flowchart illustrating operation of one embodiment of scheduler circuit 50 in the coprocessor 10. While the blocks are shown in a particular order for ease of understanding, other orders may be used. Blocks may be performed in parallel in combinatorial logic circuitry in the scheduler circuit 50. Blocks, combinations of blocks, and/or the flowchart as a whole may be pipelined over multiple clock cycles. The scheduler circuit 50 may be configured to implement the operation shown in FIG. 6.

If the scheduler circuit 50 detects a set instruction at the head of the sys op queue 48 (decision block 110, "yes" leg)

and the set instruction is marked "no execute" (decision block 112, "yes" leg), the scheduler circuit 50 may be configured to set the coprocessor state indicating "coprocessor sequence executing" (block 114). The coprocessor state should already be set to the "coprocessor sequence executing" state, so the setting in this case may simply be for completeness. Other embodiments may not set the state. The scheduler circuit 50 may be configured to delete the set instruction from the sys op queue 48. That is, the coprocessor 10 may not execute the set instruction. If the set instruction is not marked "no execute" (decision block 112, "no" leg), the scheduler circuit 50 may determine if the scheduler circuits 44 and/or 36 are reporting that there are still ops to be executed that are associated with the current AC 58 (or an older AC). If so (decision block 116, "yes" leg), the scheduler circuit 50 may be configured to wait until the scheduler circuits 44 and 36 report no more ops associated with the current AC 58 (block 118). That is, the scheduler circuit 50 may not schedule the set instruction. If the scheduler circuits 44 and 36 are reporting no more ops associated with the current AC 58 (decision block 116, "no" leg), the scheduler circuit 50 may be configured to increment the AC 58 by one and may be configured to set the coprocessor state to the "coprocessor sequence executing" state (blocks 120 and 114).

If the scheduler circuit 50 has a clear instruction at the head of the sys op queue 48 (decision block 122, "yes" leg) and the clear instruction is marked "no execute" (decision block 124, "yes" leg), the scheduler circuit 50 may be configured to delete the clear op from the sys op queue 48. Thus, the coprocessor 10 may not execute the instruction. If the clear instruction is not marked "no execute" (decision block 124, "no" leg), the scheduler circuit 50 may be configured determine if the scheduler circuits 44 and/or 36 are reporting that they still have ops to execute that are associated with the current AC 58 (or an older AC). If so (decision block 126, "yes" leg), the scheduler circuit 50 may be configured to wait until the scheduler circuits 44 and 36 report no more ops associated with the current AC 58 (block 128). That is, the scheduler circuit 50 may not schedule the clear instruction. If the scheduler circuits 44 and 36 are reporting no more ops associated with the current AC 58 (decision block 126, "no" leg), the scheduler circuit 50 may be configured to increment the AC 58 by one and may be configured to clear the coprocessor state to the "coprocessor sequence not executing" state (blocks 130 and 132).

In some embodiments, there may be other system instructions besides set and clear instruction (decision blocks 110 and 122, "no" legs). The scheduler circuit 50 may be configured to execute such ops as defined in the instruction set, updating system state 52 as appropriate (block 134).

Figure 7:
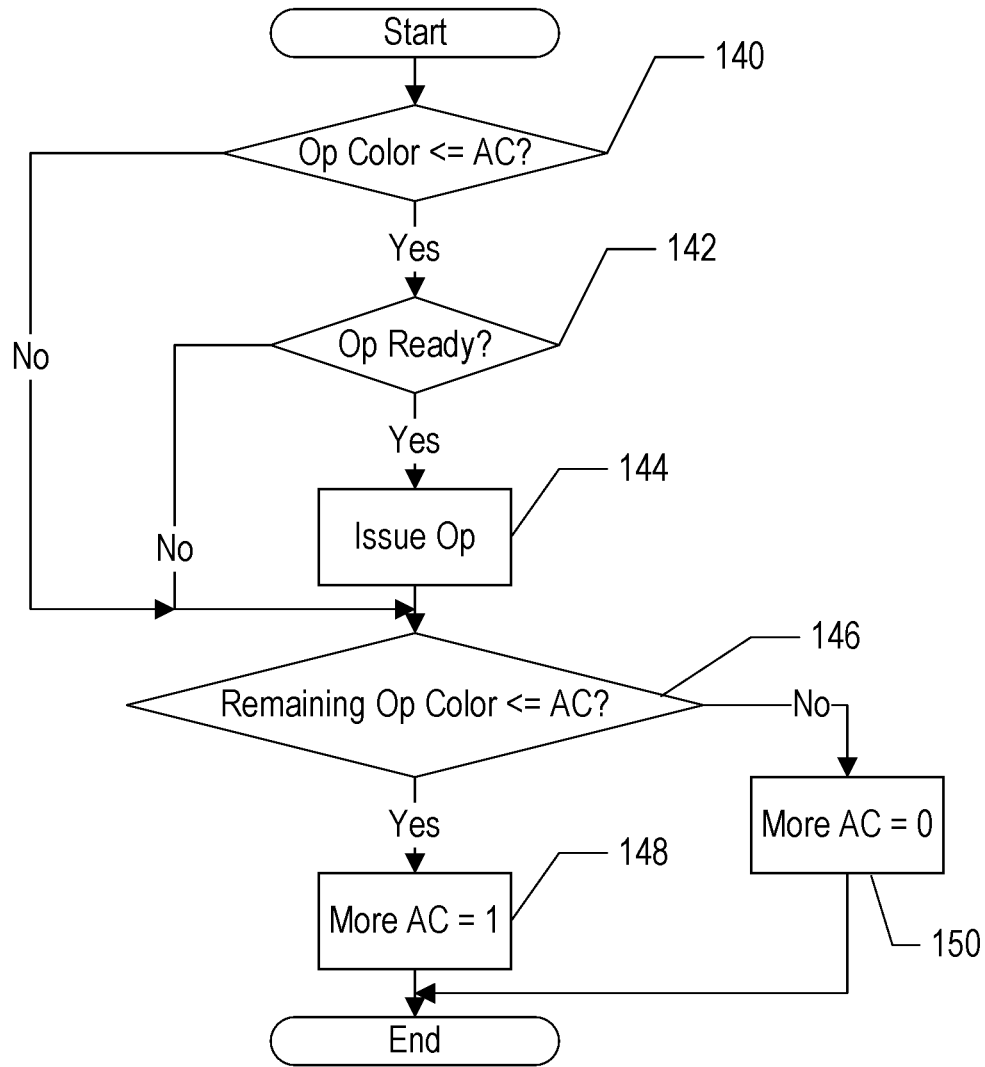
FIG. 7 is a flowchart illustrating operation of one embodiment of arithmetic and load/store scheduler circuits in the coprocessor.

FIG. 7 is a flowchart illustrating operation of one embodiment of arithmetic and load/store scheduler circuits 36 and 44 in the coprocessor 10. While the blocks are shown in a particular order for ease of understanding, other orders may be used. Blocks may be performed in parallel in combinatorial logic circuitry in the scheduler circuits 36/44. Blocks, combinations of blocks, and/or the flowchart as a whole may be pipelined over multiple clock cycles. The scheduler circuits 36/44 may be configured to implement the operation shown in FIG. 7.

For a given op, the scheduler circuit 36/44 may be configured to examine the color with which the op is tagged. If the op color is less than or equal to the AC 58 (e.g., the op color has an older color than the AC or has the same color as the AC) (decision block 140, "yes" leg) and the op is otherwise ready to execute, such as its operands are available (decision block 142, "yes" leg), the scheduler circuit 36/44 may be configured to issue the op for execution by the memory access interface 32 or the execute circuit 30 (block 144). Otherwise (decision block 140 "no" leg or decision block 142, "no" leg), the scheduler circuit 36/44 may not issue the op.

The scheduler circuit 36/44 may also be configured to determine if the remaining ops in the queue 38/46 have an op color that is less than or equal to the AC 58 (decision block 146). If so (decision block 146, "yes" leg) the scheduler circuit 36/44 may be configured to report that there are more ops associated with the current AC 58 to be executed (e.g. more AC=1, block 148). If not (decision block 146, "no" leg), the scheduler circuit 36/44 may report that there are no more ops with the current AC to be executed (e.g. more AC=0, block 150). Accordingly, a given op may be "associated with the current AC" if the op is tagged with the same color as the AC or if the op is tagged with a color that was in effect prior to the set/clear op that changed the AC to its current value (an older color). The notation "less than or equal," in the context of the AC comparison, may not be a strictly numerical comparison. Colors may have a wrap bit that may be inverted each time the color value rolls over, and differences in the wrap bits may be considered in the comparison. For example, if the wrap bit for two colors is the same, a "less than or equal" comparison may be a numerical compare. If the wrap bits differ, a "less than or equal" comparison may actually be a "greater than" comparison in a numerical basis.

Based on this disclosure, in an embodiment a system may comprise: a processor; and a coprocessor coupled to the processor, wherein: the processor is configured to issue coprocessor instructions to the coprocessor for execution; a coprocessor sequence comprises an initial synchronizing instruction followed by one or more other coprocessor instructions and terminated by a final synchronizing instruction; the initial synchronizing instruction is defined to be executed prior to the one or more other coprocessor instructions and the final synchronizing instruction; the final synchronizing instruction is defined to be executed after the initial synchronizing instruction and the one or more other coprocessor instructions; the coprocessor is configured to detect a first final synchronizing instruction corresponding to a first coprocessor sequence followed by a first initial synchronizing instruction corresponding to a second coprocessor sequence; and the coprocessor is configured to suppress execution of the first final synchronizing instruction and the first initial synchronizing instruction. In an embodiment, the coprocessor is configured to ensure that the first coprocessor sequence and the second coprocessor sequence execute and respect dependencies. In an embodiment the processor is configured to execute a first instruction in the second coprocessor sequence out of order with respect to a second instruction in the first coprocessor sequence. In an embodiment, the first coprocessor sequence and the second coprocessor sequence are issued from a first thread executing on the processor. In an embodiment, the first coprocessor sequence and the second coprocessor sequence share a context in the coprocessor. In an embodiment, the coprocessor comprises an instruction buffer configured to store a plurality of coprocessor instructions issued to the coprocessor and a decode circuit configured to decode the plurality of coprocessor instructions; the decode circuit comprises a control circuit configured to maintain a first value and to assign the first value to the plurality of coprocessor instructions as the plurality of coprocessor instructions are decoded; and the control circuit is configured to increment the first value based on a detection of the initial synchronizing instruction and the final synchronizing instruction. In an embodiment, the coprocessor comprises: a queue configured to store initial synchronizing operations corresponding to initial synchronizing instructions and final synchronizing operations corresponding to final synchronizing instructions dispatched by the decode circuit; a scheduler circuit configured to schedule operations from the queue for execution; and a storage device coupled to the scheduler circuit and configured to store a second value, wherein the scheduler circuit is configured to schedule a given initial synchronizing operation based on the second value and based on a lack of additional operations outstanding in the coprocessor associated with the second value. In an embodiment, the coprocessor comprises: one or more additional queues configured to store coprocessor operations and one or more additional scheduler circuits; a respective additional scheduler circuit of the one or more additional scheduler circuits is coupled to a respective additional queue of the one or more additional queues; and the respective additional scheduler circuit is configured to compare the second value to the values assigned to the coprocessor operations in the respective additional queue to generate an indication of whether or not additional operations in the respective additional queue have values corresponding to the second value; and wherein the respective additional scheduler circuit is configured to transmit the indication to the scheduler circuit. In an embodiment, the scheduler circuit is configured to increment the second value based on scheduling the given initial synchronizing operation. In an embodiment, the scheduler circuit is configured to schedule a given final synchronizing operation based on the incremented second value and a lack of additional operations outstanding in the coprocessor and associated with the incremented second value. In an embodiment, the scheduler circuit is configured to increment the incremented second value based on scheduling the given final synchronizing operation. In an embodiment, the decode circuit is configured to indicate that a first final synchronizing operation corresponding to the first final synchronizing instruction and first initial synchronizing operation corresponding to the first initial synchronizing instruction are not to be executed; the scheduler circuit is configured to detect the indication with respect to the first final synchronizing operation; the scheduler circuit is configured to increment the second value by two based on detecting the indication; and the scheduler circuit is configured to delete the first final synchronizing operation and the first initial synchronizing operation from the queue.

In an embodiment, coprocessor comprises: an instruction buffer configured to store a plurality of coprocessor instructions received from a processor; a decode circuit coupled to the instruction buffer and configured to decode the plurality of coprocessor instructions and dispatch coprocessor operations; a plurality of queues configured to store the coprocessor operations awaiting execution; and a plurality of scheduler circuits, wherein a given scheduler circuit of the plurality of scheduler circuits is coupled to a respective queue of the plurality of queues; wherein: the decode circuit is configured to assign a first value to coprocessor operations dispatched to the plurality of queues, wherein the decode circuit is configured to update the first value based on decoding synchronizing operations; the decode circuit is configured to dispatch the synchronizing operations to a first queue of the plurality of queues; the decode circuit is configured to detect a first initial synchronizing operation to be dispatched and a first final synchronizing operation remaining in the first queue; and the decode circuit is configured to indicate that the first initial synchronizing operation and the first final synchronizing operation are not to be executed. In an embodiment, the coprocessor further comprises a first scheduler circuit coupled to the first queue, wherein the first scheduler circuit is configured to detect the indication with the first initial synchronizing operation and the first final synchronizing operation and to delete the first initial synchronizing operation and the first final synchronizing operation from the first queue. In an embodiment, the coprocessor further comprises a storage device coupled to the first scheduler circuit and configured to store a second value, wherein the first scheduler circuit is configured to schedule a given initial synchronizing operation based on the second value and based on a lack of additional operations outstanding in the coprocessor associated with the second value. In an embodiment, the coprocessor further comprises at least one second scheduler circuit coupled to a respective queue of the plurality of queues, wherein: the second scheduler circuit is coupled to the storage device and is configured to compare the second value to the first values assigned to operations in the respective queue; and the second scheduler circuit is configured to return an indication of whether or not one or more operations in the respective queue have first values that are older than or equal to the second value. In an embodiment, the first scheduler circuit is configured to issue the given initial synchronizing operation based on the indication that there are no more operations in the respective queue having first values that are older than the second value, and wherein the storage device is updated to increment the second value based on issuing the given initial synchronizing operation. In an embodiment, the first scheduler circuit is configured to increment the second value by two based on a deletion of the first initial synchronizing operation and the first final synchronizing operation from the first queue.

In an embodiment, a method comprises: issuing coprocessor instructions to a coprocessor for execution by a processor, wherein: a coprocessor sequence comprises an initial synchronizing instruction followed by one or more other coprocessor instructions and terminated by a final synchronizing instruction; the initial synchronizing instruction is defined to be executed prior to the one or more other coprocessor instructions and the final synchronizing instruction; and the final synchronizing instruction is defined to be executed after the initial synchronizing instruction and the one or more other coprocessor instructions; detecting a first final synchronizing instruction corresponding to a first coprocessor sequence followed by a first initial synchronizing instruction corresponding to a second coprocessor sequence; and suppressing execution of the first final synchronizing instruction and the first initial synchronizing instruction. In an embodiment, the method further comprises ensuring, by the coprocessor, that the first coprocessor sequence and the second coprocessor sequence execute and respect dependencies.

Computer System

Figure 8:
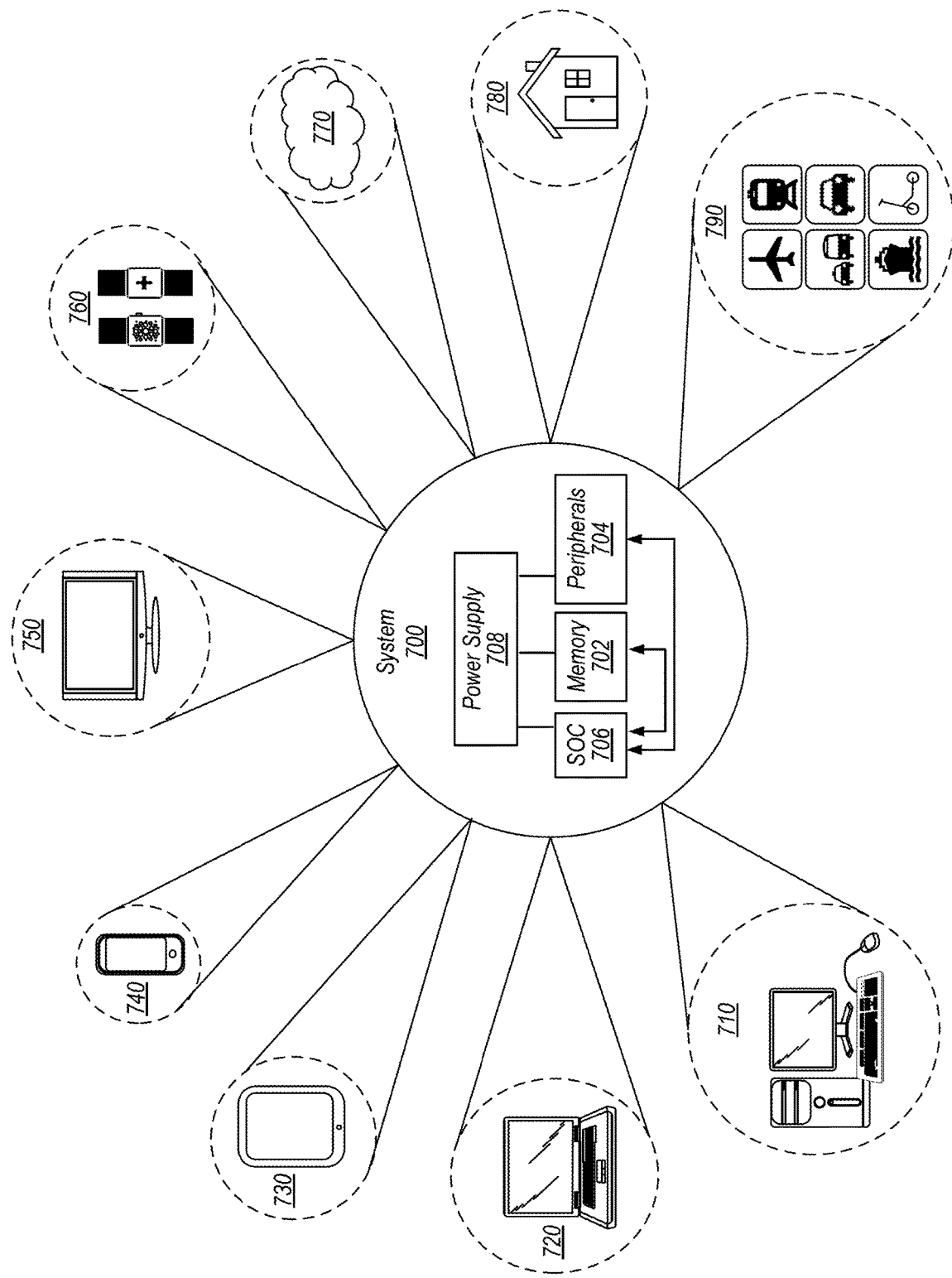
FIG. 8 is a block diagram of one embodiment of system including the processor and coprocessor, and various implementation of the system for one embodiment.

Turning next to FIG. 8, a block diagram of one embodiment of a system 700 is shown. In the illustrated embodiment, the system 700 includes at least one instance of a system on a chip (SOC) 706 coupled to one or more peripherals 704 and an external memory 702. A power supply (PMU) 708 is provided which supplies the supply voltages to the SOC 706 as well as one or more supply voltages to the memory 702 and/or the peripherals 704. In some embodiments, more than one instance of the SOC 706 may be included (and more than one memory 702 may be included as well). The SOC 706 may include one or more instances of the processor 12 and the coprocessor 10.

The peripherals 704 may include any desired circuitry, depending on the type of system 700. For example, in one embodiment, the system 700 may be a mobile device (e.g. personal digital assistant (PDA), smart phone, etc.) and the peripherals 704 may include devices for various types of wireless communication, such as Wi-Fi, Bluetooth, cellular, global positioning system, etc. The peripherals 704 may also include additional storage, including RAM storage, solid state storage, or disk storage. The peripherals 704 may include user interface devices such as a display screen, including touch display screens or multitouch display screens, keyboard or other input devices, microphones, speakers, etc. In other embodiments, the system 700 may be any type of computing system desktop personal computer, laptop, workstation, net top etc.).

The external memory 702 may include any type of memory. For example, the external memory 702 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. The external memory 702 may include one or more memory modules to which the memory devices are mounted, such as single inline memory modules (SIMMs), dual inline memory modules (DIMMs), etc. Alternatively, the external memory 702 may include one or more memory devices that are mounted on the SOC 706 in a chip-on-chip or package-on-package implementation.

As illustrated, system 700 is shown to have application in a wide range of areas. For example, system 700 may be utilized as part of the chips, circuitry, components, etc., of a desktop computer 710, laptop computer 720, tablet computer 730, cellular or mobile phone 740, or television 750 (or set-top box coupled to a television). Also illustrated is a smartwatch and health monitoring device 760. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 700 may further be used as part of a cloud-based service(s) 770. For example, the previously mentioned devices, and/or other devices, may access computing resources in the cloud (i.e., remotely located hardware and/or software resources). Still further, system 700 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected (see, e.g., reference numeral 780). Alternatively, a thermostat may monitor the temperature in the home and may automate adjustments to a heating/cooling system based on a history of responses to various conditions by the homeowner. Also illustrated in FIG. 8 is the application of system 700 to various modes of transportation (reference numeral 790). For example, system 700 may be used in the control and/or entertainment systems of aircraft, trains, buses, cars for hire, private automobiles, waterborne vessels from private boats to cruise liners, scooters (for rent or owned), and so on. In various cases, system 700 may be used to provide automated guidance (e.g., self-driving vehicles), general systems control, and otherwise. These any many other embodiments are possible and are contemplated. It is noted that the devices and applications illustrated in FIG. 8 are illustrative only and are not intended to be limiting. Other devices are possible and are contemplated.

Computer Readable Storage Medium

Turning now to FIG. 9, a block diagram of one embodiment of a computer accessible storage medium 800 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 800 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 800 in FIG. 9 may store a database 804 representative of the SOC 10. Generally, the database 804 may be a database which can be read by a program and used, directly or indirectly, to fabricate the hardware comprising the SOC 706. For example, the database may be a behavioral-level description or register-transfer level (RTL) description of the hardware functionality in a high-level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the SOC 706. The netlist may then be placed and routed to produce a data set describing geometric shapes to be applied to masks. The masks may then be used in various semiconductor fabrication steps to produce a semiconductor circuit or circuits corresponding to the SOC 10. Alternatively, the database 804 on the computer accessible storage medium 800 may be the netlist (with or without the synthesis library) or the data set, as desired.

While the computer accessible storage medium 800 stores a representation of the SOC 706, other embodiments may carry a representation of any portion of the SOC 10, as desired, including any subset of the processor 12 and/or the coprocessor 10. The database 804 may represent any portion of the above.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. A system comprising:
a hardware processor; and
a hardware coprocessor coupled to the hardware processor, wherein:
the hardware processor is configured to issue coprocessor instructions to the hardware coprocessor for execution;
a coprocessor sequence comprises an initial synchronizing instruction followed by one or more other coprocessor instructions and terminated by a final synchronizing instruction;
the initial synchronizing instruction is defined to be executed prior to the one or more other coprocessor instructions and the final synchronizing instruction;
the final synchronizing instruction is defined to be executed after the initial synchronizing instruction and the one or more other coprocessor instructions;
the hardware coprocessor is configured to detect a first final synchronizing instruction corresponding to a first coprocessor sequence followed by a first initial synchronizing instruction corresponding to a second coprocessor sequence, wherein the first final synchronizing instruction is an instance of the final synchronizing instruction, and wherein the first initial synchronizing instruction is an instance of the initial synchronizing instruction, and the first coprocessor sequence and the second coprocessor sequence are respective instances of the coprocessor sequence; and
the hardware coprocessor is configured to suppress execution of the first final synchronizing instruction and the first initial synchronizing instruction.

2. The system as recited in claim 1 wherein the hardware coprocessor is configured to ensure that dependencies between coprocessor instructions in the first coprocessor sequence and the second coprocessor sequence are respected.

3. The system as recited in claim 2 wherein the hardware coprocessor is configured to execute a first instruction in the second coprocessor sequence out of order with respect to a second instruction in the first coprocessor sequence.

4. The system as recited in claim 1 wherein the first coprocessor sequence and the second coprocessor sequence are issued from a first thread executing on the hardware processor.

5. The system as recited in claim 1 wherein the first coprocessor sequence and the second coprocessor sequence share a context in the hardware coprocessor.

6. The system as recited in claim 1 wherein:
the hardware coprocessor comprises an instruction buffer configured to store a plurality of coprocessor instructions issued to the hardware coprocessor and a decode circuit configured to decode the plurality of coprocessor instructions;
the decode circuit comprises a control circuit configured to maintain a first value and to assign the first value to the plurality of coprocessor instructions as the plurality of coprocessor instructions are decoded; and
the control circuit is configured to increment the first value based on a detection of the first initial synchronizing instruction and the control circuit is configured to increment the first value based on a detection of the first final synchronizing instruction.

7. The system as recited in claim 6 wherein:
the hardware coprocessor comprises:
a queue configured to store initial synchronizing operations corresponding to initial synchronizing instructions and final synchronizing operations corresponding to final synchronizing instructions dispatched by the decode circuit;
a scheduler circuit configured to schedule operations from the queue for execution; and
a storage device coupled to the scheduler circuit and configured to store a second value, wherein the scheduler circuit is configured to schedule a given initial synchronizing operation based on the second value and based on a lack of additional operations that are associated with the second value outstanding in the hardware coprocessor.

8. The system as recited in claim 7 wherein:
the hardware coprocessor comprises:
one or more additional queues configured to store coprocessor operations and one or more additional scheduler circuits;
a respective additional scheduler circuit of the one or more additional scheduler circuits is coupled to a respective additional queue of the one or more additional queues; and
the respective additional scheduler circuit is configured to compare the second value to values assigned to the coprocessor operations in the respective additional queue to generate an indication of whether or not additional operations in the respective additional queue have values corresponding to the second value; and wherein the respective additional scheduler circuit is configured to transmit the indication to the scheduler circuit.

9. The system as recited in claim 7 wherein the scheduler circuit is configured to increment the second value based on scheduling the given initial synchronizing operation.

10. The system as recited in claim 9 wherein the scheduler circuit is configured to schedule a given final synchronizing operation based on the incremented second value and a lack of additional operations that are associated with the incremented second value outstanding in the hardware coprocessor.

11. The system as recited in claim 10 wherein the scheduler circuit is configured to increment the incremented second value based on scheduling the given final synchronizing operation.

12. The system as recited in claim 7 wherein:
the decode circuit is configured to indicate that a first final synchronizing operation corresponding to the first final synchronizing instruction and first initial synchronizing operation corresponding to the first initial synchronizing instruction are not to be executed;
the scheduler circuit is configured to detect the indication with respect to the first final synchronizing operation;
the scheduler circuit is configured to increment the second value by two based on detecting the indication; and
the scheduler circuit is configured to delete the first final synchronizing operation and the first initial synchronizing operation from the queue.

13. A hardware coprocessor comprising:
an instruction buffer configured to store a plurality of coprocessor instructions received from a hardware processor;
a decode circuit coupled to the instruction buffer and configured to decode the plurality of coprocessor instructions and dispatch coprocessor operations;
a plurality of queues configured to store the coprocessor operations to await execution; and
a plurality of scheduler circuits, wherein a given scheduler circuit of the plurality of scheduler circuits is coupled to a respective queue of the plurality of queues;
wherein:
the decode circuit is configured to assign a first value to the coprocessor operations dispatched to the plurality of queues, wherein the decode circuit is configured to update the first value based on decoding synchronizing operations;
the decode circuit is configured to dispatch the synchronizing operations to a first queue of the plurality of queues;
the decode circuit is configured to detect a first initial synchronizing operation to be dispatched and a first final synchronizing operation remaining in the first queue; and
the decode circuit is configured to indicate that the first initial synchronizing operation and the first final synchronizing operation are not to be executed.

14. The hardware coprocessor as recited in claim 13 further comprising a first scheduler circuit coupled to the first queue, wherein the first scheduler circuit is configured to detect the indication with the first initial synchronizing operation and the first final synchronizing operation and to delete the first initial synchronizing operation and the first final synchronizing operation from the first queue.

15. The hardware coprocessor as recited in claim 14 further comprising a storage device coupled to the first scheduler circuit and configured to store a second value, wherein the first scheduler circuit is configured to schedule a given initial synchronizing operation based on the second value and based on a lack of additional operations that are associated with the second value outstanding in the hardware coprocessor.

16. The hardware coprocessor as recited in claim 15 further comprising at least one second scheduler circuit coupled to a respective queue of the plurality of queues, wherein:
the at least one second scheduler circuit is coupled to the storage device and is configured to compare the second value to the first values assigned to the coprocessor operations in the respective queue; and
the at least one second scheduler circuit is configured to return an indication of whether or not one or more operations in the respective queue have first values that are older than or equal to the second value.

17. The hardware coprocessor as recited in claim 16 wherein the first scheduler circuit is configured to issue the given initial synchronizing operation based on an indication from the at least one second scheduler circuit indicating that there are no more operations in the respective queue having first values that are older than the second value, and wherein the storage device is updated to increment the second value based on issuing the given initial synchronizing operation.

18. The hardware coprocessor as recited in claim 15 wherein the first scheduler circuit is configured to increment the second value by two based on a deletion of the first initial synchronizing operation and the first final synchronizing operation from the first queue.

19. A method comprising:
issuing, by a processor, coprocessor instructions to a coprocessor for execution, wherein:
a coprocessor sequence comprises an initial synchronizing instruction followed by one or more other coprocessor instructions and terminated by a final synchronizing instruction,
the initial synchronizing instruction is defined to be executed prior to the one or more other coprocessor instructions and the final synchronizing instruction, and
the final synchronizing instruction is defined to be executed after the initial synchronizing instruction and the one or more other coprocessor instructions;
detecting a first final synchronizing instruction corresponding to a first coprocessor sequence followed by a first initial synchronizing instruction corresponding to a second coprocessor sequence; and
suppressing execution of the first final synchronizing instruction and the first initial synchronizing instruction, wherein the first final synchronizing instruction is an instance of the final synchronizing instruction, and wherein the first initial synchronizing instruction is an instance of the initial synchronizing instruction, and the first coprocessor sequence and the second coprocessor sequence are respective instances of the coprocessor sequence.

20. The method as recited in claim 19 further comprising ensuring, by the coprocessor, that the first coprocessor sequence and the second coprocessor sequence execute respecting dependencies between coprocessor instructions in the first coprocessor sequence and the second coprocessor sequence.

* * * * *